F. T. HUGHES.
EXTENSION FOR BRAKE LEVERS.
APPLICATION FILED MAY 1, 1920. RENEWED OCT. 31, 1921.

1,409,448.

Patented Mar. 14, 1922.

INVENTOR
Frederick T. Hughes

ATTORNEY

UNITED STATES PATENT OFFICE.

FREDERICK T. HUGHES, OF LOS ANGELES, CALIFORNIA.

EXTENSION FOR BRAKE LEVERS.

1,409,448. Specification of Letters Patent. Patented Mar. 14, 1922.

Application filed May 1, 1920, Serial No. 378,098. Renewed October 31, 1921. Serial No. 511,770.

*To all whom it may concern:*

Be it known that I, FREDERICK T. HUGHES, a citizen of the United States, residing at Los Angeles, in the county of Los Angeles and State of California, have invented new and useful Improvements in Extensions for Brake Levers, of which the following is a specification.

My invention relates more specifically to an extension means for brake levers and other levers used for controlling the operating mechanism of a motor vehicle.

In many of the motor vehicles as at present manufactured, the brake and gear shifting levers are usually of such a short length and are arranged so inconveniently that when the operator desires to shift the same from one extreme position to the other a considerable movement of the body is necessitated. In order to overcome this objection, extension devices have been employed, adapted to be secured to the lever handle and to project in a convenient position to the operator. When such an extension device is employed on a lever which is provided with a locking latch operating handle, it is obvious that the operator in order to manipulate said latch handle must move the body to reach the same.

It is the object of my present invention to overcome the above recited difficulty by providing an extension handle having an auxiliary latch operating device secured thereto, arranged conveniently to the handle end of said extension member, and providing a simple means for interlocking said auxiliary latch member to the main lever latch handle, whereby the extension handle and latch operating mechanism will always be in a convenient position to the operator, thus avoiding the necessity of any movement of the body during a lever shifting operation.

Other objects will appear in the following description, will be pointed out in the claims and will be embodied in the accompanying drawings, in which:

Figure 1:
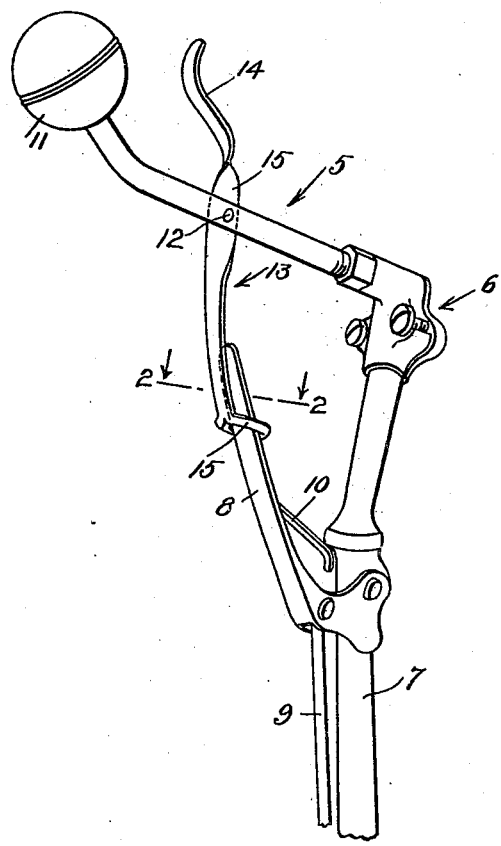
Fig. 1 is a perspective view of the upper end of an operating lever, showing my extension lever and auxiliary latch operating device applied thereto.
Figure 2:
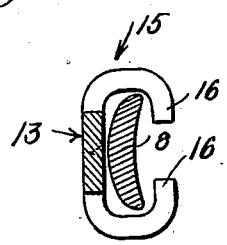
Fig. 2 is an enlarged cross section, taken on the line 2—2 of Fig. 1, viewed in the direction indicated by the arrows.

Referring more specifically to the drawings, the extension lever 5 is clamped as at 6 in any suitable manner to the upwardly projecting end of the usual operating lever 7 of a motor vehicle.

The lever 7 is provided with the usual spring pressed latch handle 8, adapted to operate the locking latch (not shown) by means of the connecting rod 9, a spring 10 being interposed between the lever 7 and handle 8 in order that the locking latch (not shown) will be held normally in an engaged position.

The extension lever 5 is preferably arranged approximately at right angles with the main lever 7 and extends inwardly toward the seat of the operator and is provided on its free end with a knob 11 adapted to be grasped by the operator.

Pivoted at 12 to the extension handle 5 is an auxiliary finger latch 13 adapted to engage with the latch handle 8 to operate the same. The finger latch 13 is preferably formed of a piece of strap metal which is suitably shaped at its upstanding end adjacent the knob 11 to form a finger grip 14. The strap metal is twisted at right angles as at 15 to form a bearing surface adapted to rest against the side of lever 5 and to receive the pivoting member 12. The lower end of the strap metal just below the handle 5 is again twisted at right angles and extends downwardly adjacent the handle 8. The extreme lower end of member 13 is bent approximately at right angles and is bifurcated to form a yoke 15, having the inturned prongs 16. The yoke 15 surrounds the handle 8, said handle being encompassed between member 13 and the prongs 16. By this arrangement it will be obvious that a hinged connection is made between the members 8 and 13, and any movement of member 13 will impart movement to member 8.

In operating my device the operator grasps the knob 11 and by manipulating the finger grip 14 causes the handle 8 to operate in the usual manner to disengage the locking latch.

It will be noted from the above description that my device is especially adapted for use in connection with combination gear and brake shifting levers, as well as brake levers, the device as above described being admirably adapted for use on the brake and gear shifting lever which is used on the well known Ford motor car.

What I claim is:

1. A lever extension device, comprising an extension member adapted to be secured to an operating lever, said operating lever being provided with a latch operating handle, and a finger latch pivoted to said extension member adapted to loosely engage with said latch operating handle.

2. A lever extension device, comprising an extension member adapted to be secured to an operating lever, which is provided with a latch operating handle, and a finger latch pivoted to said extension member provided on its downwardly projecting end with a yoke adapted to embrace said latch operating handle.

3. A lever extension device, comprising an extension member adapted to be secured to an operating lever having a latch operating handle mounted thereon, and a finger latch pivoted on said extension member, said finger latch being formed of a piece of strap metal which is twisted at right angles at its upper end to form a finger grip and is twisted at right angles at its lower end, said extreme lower end being bent outwardly at approximately right angles and formed into a yoke adapted to engage with said latch operating handle.

4. In combination with a latch operated lever for automobiles, an extension arm detachably secured to the end of said lever, and a latch operating means pivotally secured to said arm, the lower end of said latch operating means loosely engaging the latch handle of the lever.

In witness that I claim the foregoing I have hereunto subscribed my name this 8th day of April, 1920.

FREDERICK T. HUGHES.